(12) United States Patent
Dong et al.

(10) Patent No.: US 9,466,094 B1
(45) Date of Patent: Oct. 11, 2016

(54) METHOD TO IMPROVE VIDEO QUALITY UNDER LOW LIGHT CONDITIONS

(71) Applicant: SONY CORPORATION, Tokyo (JP)

(72) Inventors: Xiaogang Dong, Mountain View, CA (US); Jiro Takatori, Tokyo (JP); Tak Shing Wong, Fremont, CA (US)

(73) Assignee: Sony Corporation, Tokyo (JP)

( * ) Notice: Subject to any disclaimer, the term of this patent is extended or adjusted under 35 U.S.C. 154(b) by 22 days.

(21) Appl. No.: 14/669,433

(22) Filed: Mar. 26, 2015

(51) Int. Cl.
| | |
|---|---|
| *G06K 9/40* | (2006.01) |
| *G06T 5/00* | (2006.01) |
| *G06T 5/50* | (2006.01) |
| *H04N 5/235* | (2006.01) |
| *H04N 9/04* | (2006.01) |
| *G06T 7/20* | (2006.01) |
| *G06T 3/00* | (2006.01) |
| *G06T 15/50* | (2011.01) |

(52) U.S. Cl.
CPC ............. *G06T 5/002* (2013.01); *G06T 3/0093* (2013.01); *G06T 5/50* (2013.01); *G06T 7/20* (2013.01); *G06T 15/503* (2013.01); *H04N 5/235* (2013.01); *H04N 9/045* (2013.01); *G06T 2200/12* (2013.01); *G06T 2207/10024* (2013.01); *G06T 2207/20012* (2013.01); *G06T 2207/20028* (2013.01)

(58) Field of Classification Search
None
See application file for complete search history.

(56) References Cited

U.S. PATENT DOCUMENTS

| | | |
|---|---|---|
| 6,366,317 B1 | 4/2002 | Mattison et al. |
| 8,233,730 B1 | 7/2012 | Namboodiri et al. |
| 2013/0266057 A1 | 10/2013 | Kokaram et al. |
| 2013/0314557 A1* | 11/2013 | Furukawa .............. H04N 5/225 348/208.1 |

* cited by examiner

*Primary Examiner* — Andrew Moyer
(74) *Attorney, Agent, or Firm* — Haverstock & Owens LLP

(57) ABSTRACT

A method to improve video quality by suppressing noise and artifacts in difference frames of a video is described herein.

18 Claims, 3 Drawing Sheets

METHOD TO IMPROVE VIDEO QUALITY UNDER LOW LIGHT CONDITIONS

FIELD OF THE INVENTION

The present invention relates to video processing. More specifically, the present invention relates to improving video quality under low light conditions.

BACKGROUND OF THE INVENTION

Video recording is a standard feature for cameras, smart phones, tablets and many other devices. Compact cameras and mobile devices such as phones and tablets are usually equipped with smaller size image sensors and less than ideal optics. Improving video quality is especially important for these devices. High-end cameras and camcorders are generally equipped with larger size image sensors and better optics. Captured videos using these devices have decent quality under normal lighting conditions. However, videos recorded under low light conditions still demand significant improvement even for high-end cameras and camcorders. In addition, many recording devices have increased their resolutions in recent years (e.g., from SD to HD, from HD to 4K, and maybe 4K to 8K in future). Increased video resolution lowers the signal-to-noise ratio at every pixel location on the image sensor. Improving video quality becomes even more challenging with increased video resolution.

SUMMARY OF THE INVENTION

A method to improve video quality by suppressing noise and artifacts in difference frames of a video is described herein.

In one aspect, a method programmed in a non-transitory memory of a device comprises acquiring video content which includes a plurality of frames, including storing the video content in the non-transitory memory, performing motion estimation on a current frame and a previous frame to generate a motion estimated aligned frame, subtracting the motion estimated aligned frame from the current frame to generate a difference frame, enhancing the difference frame, adding the enhanced difference frame and the motion estimated aligned frame to generate a first enhanced current frame, enhancing the current frame directly to generate a second enhanced current frame, performing motion estimation error detection using the current frame and the motion estimated aligned frame and blending the first enhanced current frame with the second enhanced current frame based on the motion estimation error detection to generate an enhanced frame. The method further comprises capturing the video content with an image sensor. The motion estimation includes null motion estimation, global motion estimation, or local motion estimation. Enhancing the current frame includes spatial filtering or transformation domain filtering the current frame, and enhancing the difference frame includes spatial filtering or transformation domain filtering the difference frame. Filtering includes, but is not limited to, average filtering, bilateral filtering, or transformation domain filtering such as wavelet filtering. Blending utilizes a blending coefficient. The blending coefficient depends on a confidence level of motion estimation errors, wherein if the confidence level is approximately 100%, then the blending coefficient is 0, and wherein if the confidence level that there are no motion estimation errors is approximately 100%, then the blending coefficient is close to 1.

In another aspect, a system programmed in a non-transitory memory of a device comprises an image sensor configured for acquiring video content which includes a plurality of frames, hardware components configured for: performing motion estimation on a current frame and a previous frame to generate a motion estimated aligned frame, subtracting the motion estimated aligned frame from the current frame to generate a difference frame, enhancing the difference frame, adding the enhanced difference frame and the motion estimated aligned frame to generate a first enhanced current frame, enhancing the current frame directly to generate a second enhanced current frame, performing motion estimation error detection using the current frame and the motion estimated aligned frame and blending the first enhanced current frame with the second enhanced current frame based on the motion estimation error detection to generate an enhanced frame and a display device configured for displaying an enhanced video including the enhanced frame. The system further comprises an image processor for processing the video content. The motion estimation includes null motion estimation, global motion estimation, or local motion estimation. Enhancing the current frame includes spatial filtering or transformation domain filtering the current frame, and enhancing the difference frame includes spatial filtering or transformation domain filtering the difference frame. Filtering includes, but is not limited to average filtering, bilateral filtering, or transformation domain filtering such as wavelet filtering. Blending utilizes a blending coefficient. The blending coefficient depends on a confidence level of motion estimation errors, wherein if the confidence level is approximately 100%, then the blending coefficient is 0, and wherein if the confidence level that there are no motion estimation errors is approximately 100%, then the blending coefficient is close to 1.

In another aspect, a camera apparatus comprises an image sensor configured for acquiring video content which includes a plurality of frames, a non-transitory memory for storing an application, the application for: performing motion estimation on a current frame and a previous frame to generate a motion estimated aligned frame, subtracting the motion estimated aligned frame from the current frame to generate a difference frame, enhancing the difference frame, adding the enhanced difference frame and the motion estimated aligned frame to generate a first enhanced current frame, enhancing the current frame directly to generate a second enhanced current frame, performing motion estimation error detection using the current frame and the motion estimated aligned frame and blending the first enhanced current frame with the second enhanced current frame based on the motion estimation error detection to generate an enhanced frame and a processing component coupled to the memory, the processing component configured for processing the application. The camera apparatus further comprises an image processor for processing the video content. The motion estimation includes null motion estimation, global motion estimation, or local motion estimation. Enhancing the current frame includes spatial filtering or transformation domain filtering the current frame, and enhancing the difference frame includes spatial filtering or transformation domain filtering the difference frame. Filtering includes, but is not limited to, average filtering, bilateral filtering, or transformation domain filtering such as wavelet filtering. Blending utilizes a blending coefficient. The blending coefficient depends on a confidence level of motion estimation errors, wherein if the confidence level is approximately 100%, then the blending coefficient is 0, and wherein if the confidence level that there are no motion estimation errors is approximately 100%, then the blending coefficient is close to 1.

DETAILED DESCRIPTION OF THE PREFERRED EMBODIMENT

A video includes a sequence of frames or 2D images in temporal order. Each frame or 2D image usually consists of thousands or millions of pixels. There are one or more values at each pixel location. For example, there is one value per pixel in grayscale images, and there are three values per pixel in color images. The difference frame of two neighbor frames is obtained by subtracting the pixel values of the previous frame from the corresponding pixel values of the current frame. The correspondence of pixel locations between two frames may consider the relative movements of objects. The difference frame is generally sparse, e.g., image values are either zeros or close to zeros at most of pixel locations. A method to improve video quality by suppressing noise and artifacts in the difference frames is described herein.

Figure 1:
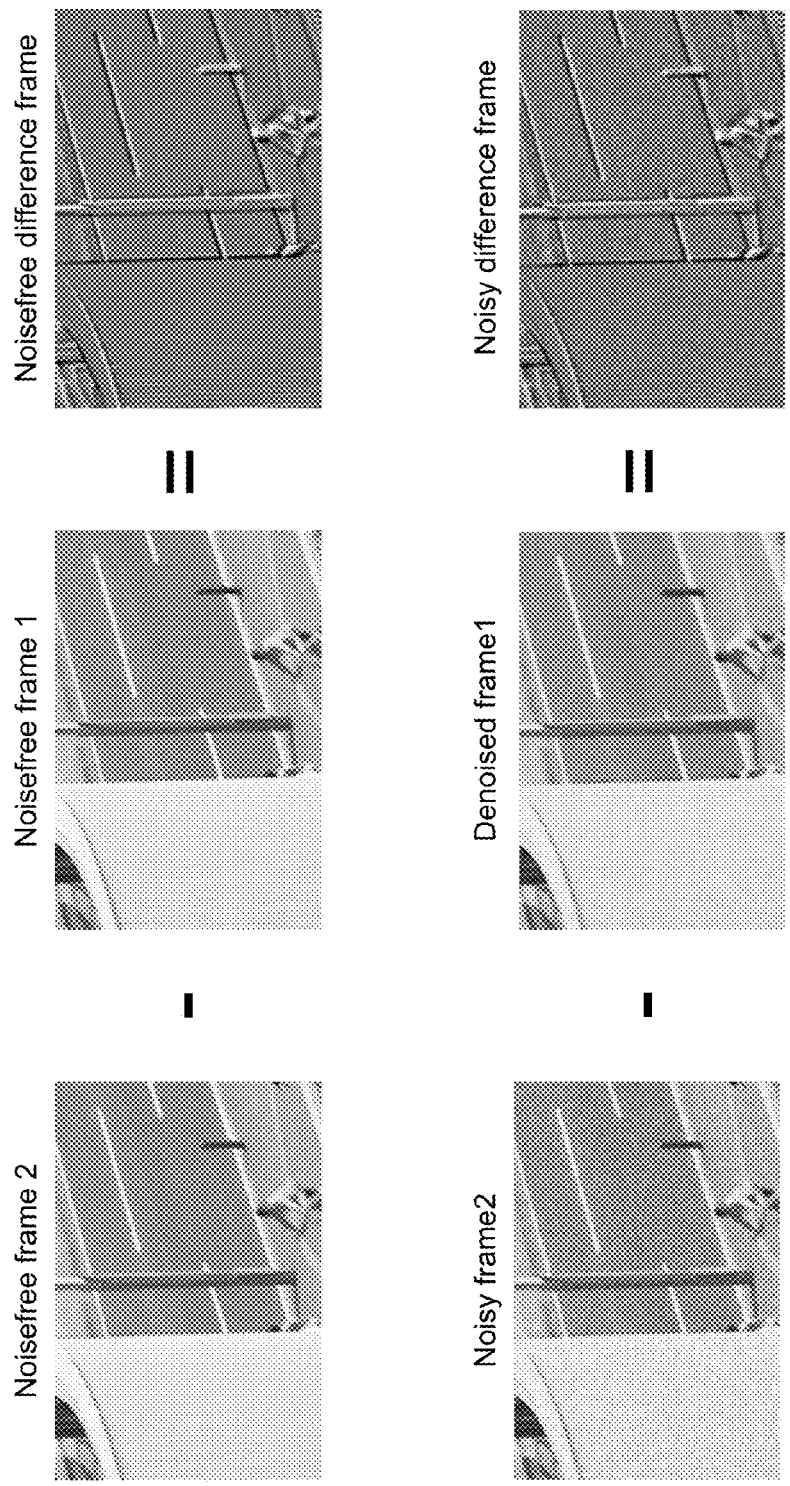
FIG. 1 illustrates examples of difference frames according to some embodiments.

FIG. 1 illustrates examples of difference frames according to some embodiments. When a noisefree frame 1 is subtracted from a noisefree frame 2, the result is a noisefree difference frame. The difference frame looks mid-gray or closed to mid-gray at most of pixel locations. Here mid-gray color represents the pixel value 0 in the difference frame. The difference frame looks brighter at some pixel locations if the values at these pixel locations in the noisefree frame 2 are larger than the corresponding values in the noisefree frame 1. Similarly, the difference frames look darker at some other pixel locations when the values at these pixel locations in the noisefree frame 2 are smaller than the corresponding values of the noisefree frame 1. Relative motions of the objects between the two frames are not considered in this example. The difference frame may be seen as mid-gray almost everywhere when perfect motion compensation is applied between the two frames.

When a denoised frame 1 is subtracted from a noisy frame 2, the result is a noisy difference frame. Averages of pixel values are 0 or close to 0 in many areas in the difference frame. These areas are shown in mid-gray or close to mid-gray. However, values at individual pixel locations may deviate from 0 due to the presence of noise. If the noise in the noisy difference frame is suppressed and made as close as possible to the noisefree difference frame, a decently denoised frame 2 is able to be obtained.

Figure 2:
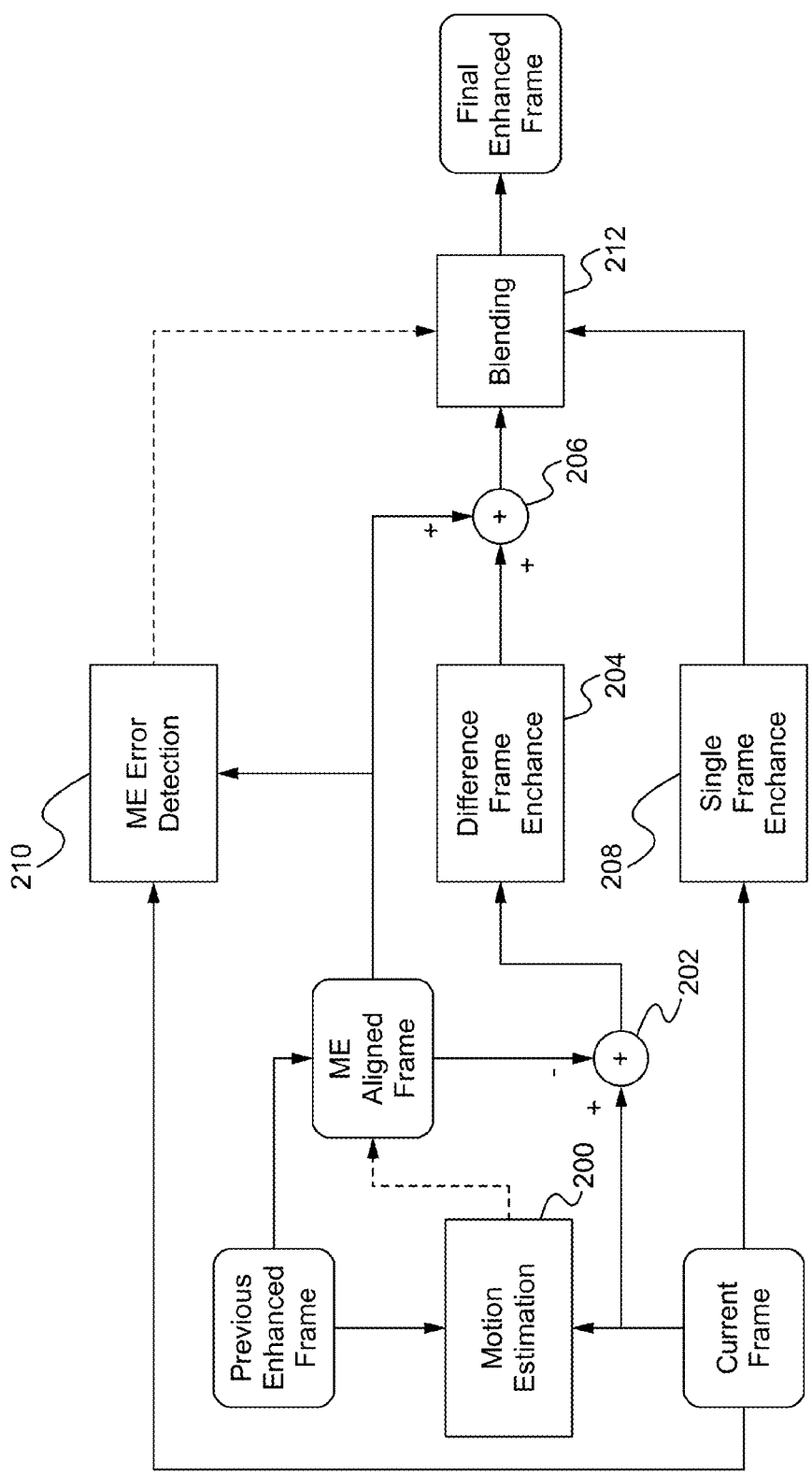
FIG. 2 illustrates a flowchart of a method of improving video quality according to some embodiments.

FIG. 2 illustrates a flowchart of a method of improving video quality according to some embodiments. In some embodiments, a video is acquired or received. For example, a user takes a video using a digital camera device and the video includes many frames. In the step 200, motion estimation is implemented using a current frame (e.g., noisy frame) and a previous (or preceding) enhanced frame (e.g., denoised frame) to generate a Motion Estimation (ME) aligned frame. A goal of the ME aligned frame is maximizing sparsity of difference frames (or canceling meaningful signal as much as possible, so only noise remains in difference frames). In the step 202, the ME aligned frame is subtracted from the current frame to generate a difference frame. In the step 204, the difference frame is enhanced. The difference frame is enhanced by any implementation of image enhancement algorithms. Suitable image enhancement algorithms may include steps such as noise reduction and/or artifact removal. In the step 206, the ME aligned frame and the enhanced difference frame are added together to generate a first enhanced current frame. Such enhancement is based on difference frame enhancement.

In the step 210, ME error detection is implemented using the current frame and the ME aligned frame as input. ME error detection attempts to detect any errors in the estimations of object movements. If there are any errors, different image contents may present at the corresponding pixel locations of the current frame and the ME aligned frame. As a result, some motion artifacts may be observed in the output of the step 206, e.g., the first enhanced current frame. Therefore an alternative enhancement method is needed for those areas affected by ME errors. One possible candidate is the direct single frame enhancement.

In the step 208, a single frame enhance method is implemented using the current frame as input. The single frame enhance method includes any implementation of image enhancement algorithms including steps such as noise reduction and/or artifact removal. The single frame enhance method outputs a second enhanced current frame. In the step 212, based on the ME error detection, the first enhanced current frame and the second enhanced frame are blended to generate a final enhanced frame. The final enhanced frame is used to generate a video with better video quality.

Motion estimation is generated using the current frame and the previous enhanced frame. Various motion estimations are able to be used depending on the desired system complexity. "Null" motion assumes there are no motions at all, which is simplest. Global motion assumes that there is only camera movement. Local motion assumes both camera and object movements. Motion estimation is generally not error-free. In one example, if the "NULL" motion is assumed, then there are motion estimation errors if there are any camera or object movements. In another example, if the global motion is assumed, then there are motion estimation errors if the global motion is not accurate enough or there are any object movements. Even when the local motion is applied, there usually exists some inaccurate estimation of local motions. Many different kinds of artifacts may happen when motion estimation errors occur. It is important to have an "ME Error Detection" block to detect motion estimation error as well as some areas more suspect to artifacts.

Various image enhancement technologies are able to be applied to both "single frame enhance" and "difference frame enhance." Sample technologies include: simple average filter, bilateral filter, "wavelet transform on incomplete image data and its applications in image processing", as described in U.S. Pat. No. 8,731,281, issued on May 20, 2014, and "an improved method to measure local image similarity and its application in image processing," as described in U.S. patent application Ser. No. 12/931,962, filed on Feb. 15, 2011, which is incorporated by reference in its entirety for all purposes.

A blending step of the first enhanced current frame (based on enhancing difference frame) and the second enhanced current frame (based on enhancing single frame) is applied to deal with ME errors. The result is: final enhanced frame= $(1-\alpha)$ second enhanced current frame+$\alpha$ first enhanced current frame. Thus, if α=0, then the final enhanced current frame is 100% of the second enhanced current frame and 0% of the first enhanced current frame. If α=0.9, then the final enhanced frame is 10% of the second enhanced current frame blended with 90% of the first enhanced current frame. Blending is able to be on a pixel basis, block level or any other implementation.

The blending coefficient α depends on the confidence level of ME errors detection. When confidence about occurrences of ME errors is 100%, α=0 is used. When confidence that there are no ME errors is approximately 100% (e.g., greater than 90%), α close to 1 (e.g., 0.9) is used. Any α between 0 and 1 is able to be used. For example, if the confidence of ME errors is 50%, then α is able to be 0.5.

The confidence level is able to be determined in any manner. For example, the difference between the current frame and the ME aligned frame is calculated, and if the difference is above a first threshold, then the confidence that there are errors is 100%, but if the difference is below the first threshold but above a second threshold, then the confidence of errors is 90%, and so on, until if the difference is below a final (e.g., lowest) threshold, then the confidence of errors is 0% (e.g., 100% confidence of no errors). There are able to be any number of thresholds. A table is able to be used to provide the confidence of errors or no errors corresponding with the difference amount. Alternatively, a continuous function mapping from the difference between the current frame and the ME aligned frame to the confidence level may also be defined.

Figure 3:
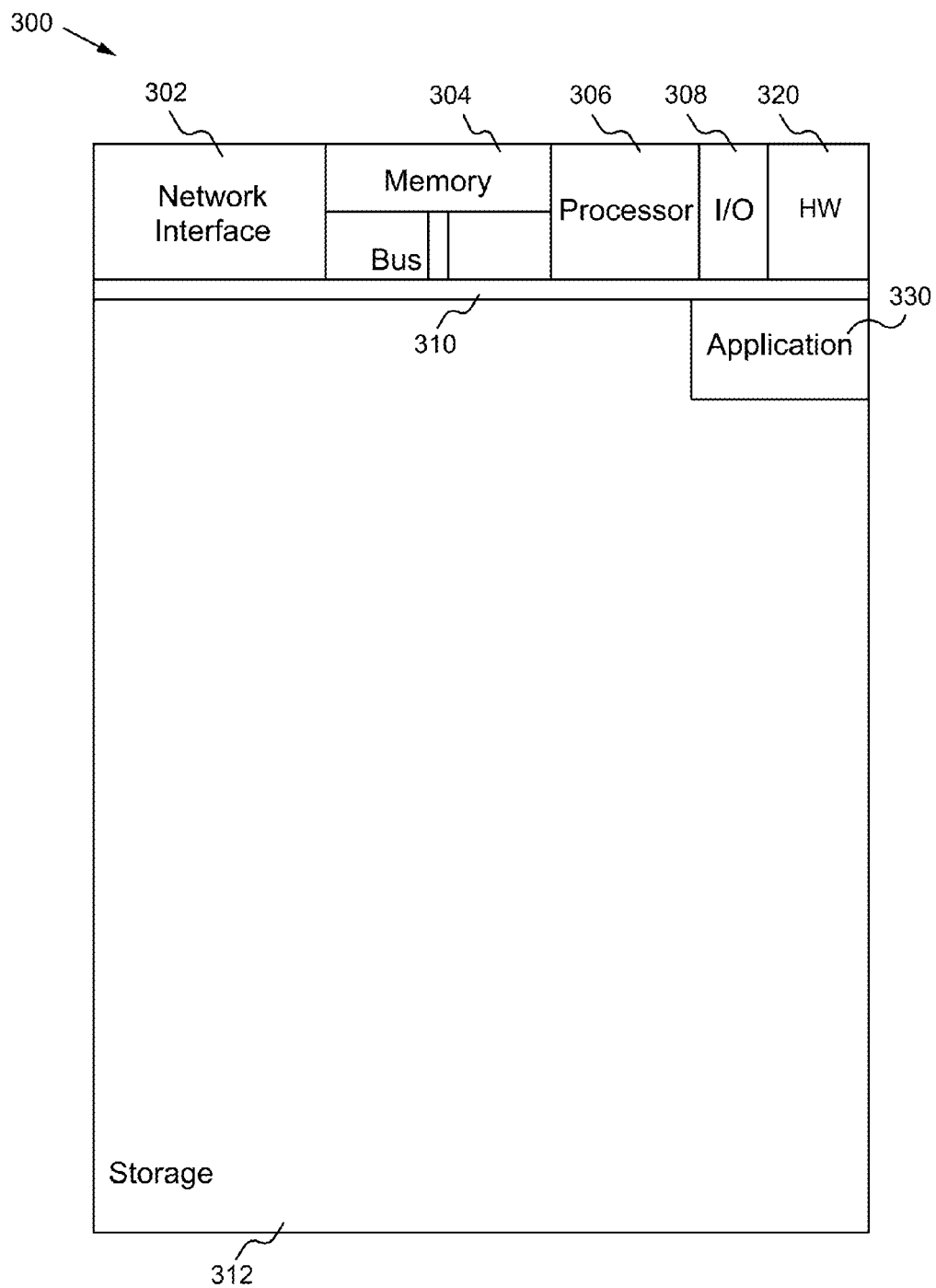
FIG. 3 illustrates a block diagram of an exemplary computing device configured to implement the method of improving video quality according to some embodiments.

FIG. 3 illustrates a block diagram of an exemplary computing device configured to implement the improved video quality method according to some embodiments. The computing device 300 is able to be used to acquire, store, compute, process, communicate and/or display information such as images and videos. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, Blu-ray disc/drive, flash memory card or any other storage device. The computing device 300 is able to include one or more network interfaces 302. An example of a network interface includes a network adapter connected to an Ethernet or other type of wired or wireless network interface adapter. The I/O device(s) 308 are able to include one or more of the following: keyboard, mouse, monitor, screen, printer, modem, touchscreen, button interface and other devices. Improved video quality method application(s) 330 used to implement the improved video quality method are likely to be stored in the storage device 312 and memory 304 and processed as applications are typically processed. More or fewer components shown in FIG. 3 are able to be included in the computing device 300. In some embodiments, specific hardware 320 is included for the improved video quality method. Although the computing device 300 in FIG. 3 includes applications 330 and hardware 320 for the improved video quality method, the improved video quality method is able to be implemented on a computing device in hardware, firmware, software or any combination thereof. For example, in some embodiments, the improved video quality method applications 330 are programmed in a memory and executed using a processor. In another example, in some embodiments, the improved video quality method hardware 320 is programmed hardware logic including gates specifically designed to implement the improved video quality method.

In some embodiments, the improved video quality method application(s) 330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, an augmented reality device, a digital camera, a digital camcorder, a camera phone, a smart phone, a tablet computer, a mobile device, a video player, a video disc writer/player (e.g., DVD writer/player, blu-ray disc writer/player), a television, a home entertainment system, a wearable computing device (e.g., smart watch) or any other suitable computing device.

To utilize the improved video quality method described herein, a device such as a digital camera/camcorder is used to acquire image/video content. The improved video quality method is automatically used when acquiring and/or encoding the content. The improved video quality method is able to be implemented with user assistance or automatically without user involvement.

In operation, the improved video quality method provides better quality content, particularly in low light situations.

Some Embodiments of a Method to Improve Video Quality Under Low Light Conditions 1. A method programmed in a non-transitory memory of a device comprising:
   a. acquiring video content which includes a plurality of frames, including storing the video content in the non-transitory memory;
   b. performing motion estimation on a current frame and a previous frame to generate a motion estimated aligned frame;
   c. subtracting the motion estimated aligned frame from the current frame to generate a difference frame;
   d. enhancing the difference frame;
   e. adding the enhanced difference frame and the motion estimated aligned frame to generate a first enhanced current frame;
   f. enhancing the current frame directly to generate a second enhanced current frame;
   g. performing motion estimation error detection using the current frame and the motion estimated aligned frame; and
   h. blending the first enhanced current frame with the second enhanced current frame based on the motion estimation error detection to generate an enhanced frame.
2. The method of clause 1 further comprising capturing the video content with an image sensor.
3. The method of clause 1 wherein the motion estimation includes null motion estimation, global motion estimation, or local motion estimation.
4. The method of clause 1 wherein enhancing the current frame includes spatial filtering or transformation domain filtering the current frame, and enhancing the difference frame includes spatial filtering or transformation domain filtering the difference frame.
5. The method of clause 4 wherein filtering includes average filtering, bilateral filtering, or transformation domain filtering including wavelet filtering.

6. The method of clause 1 wherein blending utilizes a blending coefficient.
7. The method of clause 7 wherein the blending coefficient depends on a confidence level of motion estimation errors, wherein if the confidence level is approximately 100%, then the blending coefficient is 0, and wherein if the confidence level that there are no motion estimation errors is approximately 100%, then the blending coefficient is close to 1.
8. A system programmed in a non-transitory memory of a device comprising:
   a. an image sensor configured for acquiring video content which includes a plurality of frames;
   b. hardware components configured for:
      i. performing motion estimation on a current frame and a previous frame to generate a motion estimated aligned frame;
      ii. subtracting the motion estimated aligned frame from the current frame to generate a difference frame;
      iii. enhancing the difference frame;
      iv. adding the enhanced difference frame and the motion estimated aligned frame to generate a combined enhanced difference frame;
      v. enhancing the current frame directly to generate a second enhanced current frame;
      vi. performing motion estimation error detection using the current frame and the motion estimated aligned frame; and
      vii. blending the first enhanced current frame with the second enhanced current frame based on the motion estimation error detection to generate an enhanced frame; and
   c. a display device configured for displaying an enhanced video including the enhanced frame.
9. The system of clause 8 further comprising an image processor for processing the video content.
10. The system of clause 8 wherein the motion estimation includes null motion estimation, global motion estimation, or local motion estimation.
11. The system of clause 8 wherein enhancing the current frame includes spatial filtering or transformation domain filtering the current frame, and enhancing the difference frame includes spatial filtering or transformation domain filtering the difference frame.
12. The system of clause 11 wherein filtering includes average filtering, bilateral filtering, or transformation domain filtering including wavelet filtering.
13. The system of clause 8 wherein blending utilizes a blending coefficient.
14. The system of clause 13 wherein the blending coefficient depends on a confidence level of motion estimation errors, wherein if the confidence level is approximately 100%, then the blending coefficient is 0, and wherein if the confidence level that there are no motion estimation errors is approximately 100%, then the blending coefficient is close to 1.
15. A camera apparatus comprising:
    a. an image sensor configured for acquiring video content which includes a plurality of frames;
    b. a non-transitory memory for storing an application, the application for:
       i. performing motion estimation on a current frame and a previous frame to generate a motion estimated aligned frame;
       ii. subtracting the motion estimated aligned frame from the current frame to generate a difference frame;
       iii. enhancing the difference frame;
       iv. adding the enhanced difference frame and the motion estimated aligned frame to generate a first enhanced current frame;
       v. enhancing the current frame directly to generate a second enhanced current frame;
       vi. performing motion estimation error detection using the current frame and the motion estimated aligned frame; and
       vii. blending the first enhanced current frame with the second enhanced current frame based on the motion estimation error detection to generate an enhanced frame; and
    c. a processing component coupled to the memory, the processing component configured for processing the application.
16. The camera apparatus of clause 15 further comprising an image processor for processing the video content.
17. The camera apparatus of clause 15 wherein the motion estimation includes null motion estimation, global motion estimation, or local motion estimation.
18. The camera apparatus of clause 15 wherein enhancing the current frame includes spatial filtering or transformation domain filtering the current frame, and enhancing the difference frame includes spatial filtering or transformation domain filtering the difference frame.
19. The camera apparatus of clause 18 wherein filtering includes average filtering, bilateral filtering, or transformation domain filtering including wavelet filtering.
20. The camera apparatus of clause 15 wherein blending utilizes a blending coefficient.
21. The camera apparatus of clause 20 wherein the blending coefficient depends on a confidence level of motion estimation errors, wherein if the confidence level is approximately 100%, then the blending coefficient is 0, and wherein if the confidence level that there are no motion estimation errors is approximately 100%, then the blending coefficient is close to 1.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
   a. acquiring video content which includes a plurality of frames, including storing the video content in the non-transitory memory;
   b. performing motion estimation on a current frame and a previous frame to generate a motion estimated aligned frame;
   c. subtracting the motion estimated aligned frame from the current frame to generate a difference frame;
   d. enhancing the difference frame;
   e. adding the enhanced difference frame and the motion estimated aligned frame to generate a first enhanced current frame;
   f. enhancing the current frame directly to generate a second enhanced current frame;
   g. performing motion estimation error detection using the current frame and the motion estimated aligned frame; and h. blending the first enhanced current frame with the second enhanced current frame based on the motion estimation error detection to generate an enhanced frame, wherein enhancing the current frame includes spatial filtering or transformation domain filtering the current frame, and enhancing the difference frame includes spatial filtering or transformation domain filtering the difference frame.

2. The method of claim 1 further comprising capturing the video content with an image sensor.

3. The method of claim 1 wherein the motion estimation includes null motion estimation, global motion estimation, or local motion estimation.

4. The method of claim 1 wherein filtering includes average filtering, bilateral filtering, or transformation domain filtering including wavelet filtering.

5. The method of claim 1 wherein blending utilizes a blending coefficient.

6. The method of claim 5 wherein the blending coefficient depends on a confidence level of motion estimation errors, wherein if the confidence level is approximately 100%, then the blending coefficient is 0, and wherein if the confidence level that there are no motion estimation errors is approximately 100%, then the blending coefficient is close to 1.

7. A system programmed in a non-transitory memory of a device comprising:
 a. an image sensor configured for acquiring video content which includes a plurality of frames;
 b. an image processor configured for:
  i. performing motion estimation on a current frame and a previous frame to generate a motion estimated aligned frame;
  ii. subtracting the motion estimated aligned frame from the current frame to generate a difference frame;
  iii. enhancing the difference frame;
  iv. adding the enhanced difference frame and the motion estimated aligned frame to generate a first enhanced current frame;
  v. enhancing the current frame directly to generate a second enhanced current frame;
  vi. performing motion estimation error detection using the current frame and the motion estimated aligned frame; and
  vii. blending the first enhanced current frame with the second enhanced current frame based on the motion estimation error detection to generate an enhanced frame, wherein enhancing the current frame includes spatial filtering or transformation domain filtering the current frame, and enhancing the difference frame includes spatial filtering or transformation domain filtering the difference frame; and
 c. a display device configured for displaying an enhanced video including the enhanced frame.

8. The system of claim 7 wherein the image processor is for processing the video content.

9. The system of claim 7 wherein the motion estimation includes null motion estimation, global motion estimation, or local motion estimation.

10. The system of claim 7 wherein filtering includes average filtering, bilateral filtering, or transformation domain filtering including wavelet filtering.

11. The system of claim 7 wherein blending utilizes a blending coefficient.

12. The system of claim 11 wherein the blending coefficient depends on a confidence level of motion estimation errors, wherein if the confidence level is approximately 100%, then the blending coefficient is 0, and wherein if the confidence level that there are no motion estimation errors is approximately 100%, then the blending coefficient is close to 1.

13. A camera apparatus comprising:
 a. an image sensor configured for acquiring video content which includes a plurality of frames;
 b. a non-transitory memory for storing an application, the application for:
  i. performing motion estimation on a current frame and a previous frame to generate a motion estimated aligned frame;
  ii. subtracting the motion estimated aligned frame from the current frame to generate a difference frame;
  iii. enhancing the difference frame;
  iv. adding the enhanced difference frame and the motion estimated aligned frame to generate a first enhanced current frame;
  v. enhancing the current frame directly to generate a second enhanced current frame;
  vi. performing motion estimation error detection using the current frame and the motion estimated aligned frame; and
  vii. blending the first enhanced current frame with the second enhanced current frame based on the motion estimation error detection to generate an enhanced frame, wherein enhancing the current frame includes spatial filtering or transformation domain filtering the current frame, and enhancing the difference frame includes spatial filtering or transformation domain filtering the difference frame; and
 c. a processor coupled to the memory, the processor configured for processing the application.

14. The camera apparatus of claim 13 wherein the processor is for processing the video content.

15. The camera apparatus of claim 13 wherein the motion estimation includes null motion estimation, global motion estimation, or local motion estimation.

16. The camera apparatus of claim 13 wherein filtering includes average filtering, bilateral filtering, or transformation domain filtering including wavelet filtering.

17. The camera apparatus of claim 13 wherein blending utilizes a blending coefficient.

18. The camera apparatus of claim 17 wherein the blending coefficient depends on a confidence level of motion estimation errors, wherein if the confidence level is approximately 100%, then the blending coefficient is 0, and wherein if the confidence level that there are no motion estimation errors is approximately 100%, then the blending coefficient is close to 1.

* * * * *